H. RIETVELD.
ALARM CONTROL FOR DAMPERS.
APPLICATION FILED DEC. 27, 1921.

1,428,255.

Patented Sept. 5, 1922.

Witness:
R. E. Weber

Inventor:
Harry Rietveld
Young & Young
Attorneys

Patented Sept. 5, 1922.

1,428,255

UNITED STATES PATENT OFFICE.

HARRY RIETVELD, OF MILWAUKEE, WISCONSIN.

ALARM CONTROL FOR DAMPERS.

Application filed December 27, 1921. Serial No. 524,942.

*To all whom it may concern:*

Be it known that I, HARRY RIETVELD, a citizen of the United States, and resident of Milwaukee, in the county of Milwaukee and State of Wisconsin, have invented certain new and useful Improvements in Alarm Controls for Dampers; and I do hereby declare that the following is a full, clear, and exact description thereof.

The invention relates to improvements in an alarm control for dampers.

A bracket is provided apertured to receive a U bolt to secure an alarm clock thereto, and is provided with a groove to receive a projection on a weight which is provided with a lug resting against the winding wing of the clock in such manner that when the wing is rotated on the setting off of the alarm, the lock is released and the weight is permitted to fall and thus operates the damper through the medium of a chain. The support is provided with an additional aperture and a flange to support the weight when the alarm is not set.

Primary objects of the invention are simplicity of construction and readiness of manufacture, the parts being reduced to a minimum number, the groove and flange on the support being easy to make and the weight being simple in outline and easy to cast.

Other objects and advantages will appear as the description proceeds.

Reference is had to the accompanying drawing, in which

Figure 1:
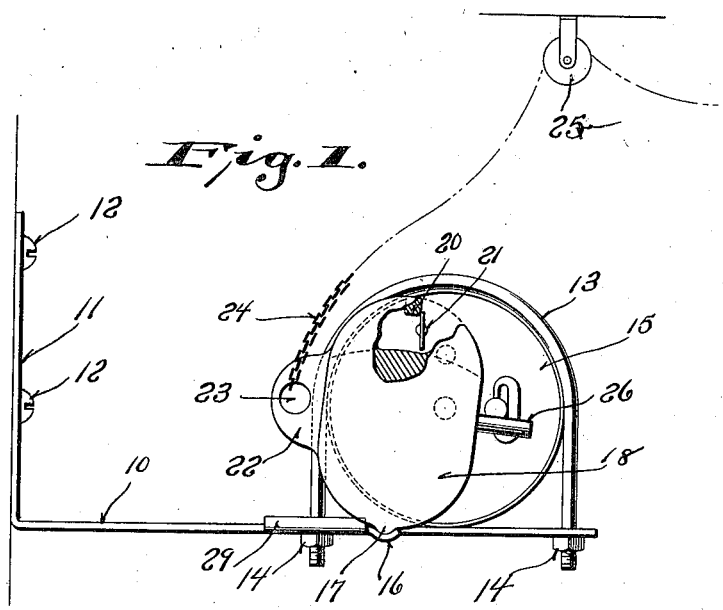
Figure 1 is a side elevation.
Figure 2:
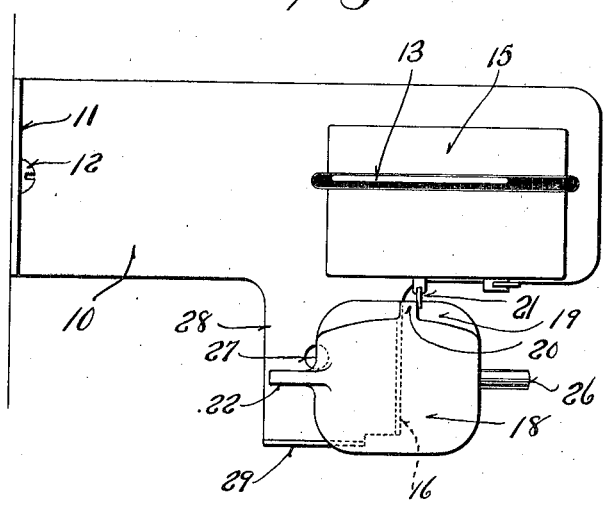
Figure 2 is a plan.

Bracket 10 is provided with an arm 11 secured by screws 12 to a suitable support and is apertured to receive the ends of U bolt 13 which is secured by nuts 14, clamping the clock 15 against bracket 10. The bracket is provided with a deformation for receiving a projection 17 on weight 18 which has a shoulder 19 on one side, and a lug 20 spaced thereabove for contacting with the winding wing 21 of the alarm of the clock. An ear 22 is integral with the weight and has an aperture 23 receiving the end of chain 24 which extends over a pulley 25.

When the parts are in the position shown in Figure 1, the device is set for operation and when the alarm is set off, winding wing 21 rotates and releases lug 20, the wing being free to move below the same. On the release of the lug, weight 18 topples off bracket 10 and tightens chain 24, thus operating the damper. When it is not desired to set the damper control, weight 18 may be deposited on bracket 10, post 26 being provided for that purpose adapted to enter opening 27 in arm 28 of bracket 10, an upwardly directed flange 29 being provided to prevent the weight from falling to one side.

It is apparent that a device of extreme simplicity, is constructed, as there are only 3 primary parts in addition to the alarm clock. The weight structure is reduced to the lowest terms of simplicity. The parts are durable and of such nature as to be very easy to manufacture.

While a preferred embodiment of the invention has been illustrated and described, it is to be understood that the present invention is not confined to such specific embodiment, but may be otherwise embodied within the spirit of the invention and the scope of the following claims, and it will further be understood that a substantial range of equivalence is contemplated.

I claim:

1. The combination of an alarm clock, a support therefor, a weight, a projection thereon, a support for said projection said projection and said support having limited points of contact to permit said weight to move and fall from said support, and a lug on said weight contacting with the winding wing of the alarm of said clock for holding said weight in stable position until the alarm goes off and the wing rotates.

2. The combination of an alarm clock, a support therefor, a weight, a projection on said weight, a support having a groove therein for the reception of said weight, said projection and said groove having limited points of contact to permit said weight to move and fall from said support, and a lug on said weight contacting with the winding wing of the alarm of said clock for holding said weight in stable position until the alarm goes off and the wing rotates.

3. In a time control for a damper, a weight, a lug thereon, an ear rigid with said weight and having an aperture, a chain secured to said ear for controlling a damper, a projection for supporting said weight in one position, and a post for supporting said weight in another position.

In testimony that I claim the foregoing I have hereunto set my hand at Milwaukee, in the county of Milwaukee and State of Wisconsin.

HARRY RIETVELD.